(12) United States Patent
Nguyen (10) Patent No.: US 6,361,085 B2
(45) Date of Patent: Mar. 26, 2002

(54) APPARATUS FOR REDUCING FASTENER BENDING STRESS IN FLANGED CONNECTIONS

(75) Inventor: Lan T. Nguyen, League City, TX (US)

(73) Assignee: Cooper Cameron Corporation, Houston, TX (US)

( * ) Notice: Subject to any disclaimer, the term of this patent is extended or adjusted under 35 U.S.C. 154(b) by 0 days.

(21) Appl. No.: 09/729,746

(22) Filed: Dec. 5, 2000

Related U.S. Application Data (62) Division of application No. 09/216,201, filed on Dec. 18, 1998.

(51) Int. Cl.[7] .................................................. F16L 19/00
(52) U.S. Cl. ........................................................ 285/368
(58) Field of Search ................................ 285/368, 412; 411/537, 538, 936, 275, 230

(56) References Cited

U.S. PATENT DOCUMENTS 3,135,538 A * 6/1964 George
5,230,540 A * 7/1993 Lewis

FOREIGN PATENT DOCUMENTS

NO 93388 * 2/1959

* cited by examiner

Primary Examiner—Flemming Saether
(74) Attorney, Agent, or Firm—Jackie Lee Duke

(57) ABSTRACT

An apparatus for reducing the bending stress imparted to threaded fasteners in flanged connections is disclosed. The apparatus includes a radially tapered surface machined in the backface of the flanges to coact with the head of the threaded fastener as the threaded fastener is tightened to a predetermined torque value. This coaction compensates for flange deflection as the threaded fastener is tightened.

9 Claims, 7 Drawing Sheets

APPARATUS FOR REDUCING FASTENER BENDING STRESS IN FLANGED CONNECTIONS

This is a divisional application of Application Ser. No. 09/216,201 filed Dec. 18,1998, hereby incorporated herein by reference.

BACKGROUND OF THE INVENTION

1. Field of the Invention

This invention relates to a novel apparatus for reducing stresses due to bending in threaded fasteners, particularly bolts and cap screws, used in connecting flanged connections. Such flanged connections have a wide variety of industrial uses including connecting structural members that will be subjected to critical external loads and in sealing high pressure vessels. The flanges used in such applications must be maintained in face to face contact to ensure proper operation. This face to face contact is maintained by the plurality of threaded fasteners that are tightened to a high percentage of their yield strength to ensure this contact is maintained. It is well known in the art that such flanges bend in an axial or meridional direction during this tightening procedure. This meridional bending is transmitted to the threaded fasteners and is known to contribute significantly to the stress in the threaded fastener and reduces the amount of tightening to which the threaded fastener can be safely subjected. This in turn reduces the face to face contact between the flanges and therefore the load to which the flanged connection can be subjected.

The present invention has particular applicability in the oil and gas industry where large diameter tubular members with flanged end connections, called "risers" or "riser joints", are used. These risers are used in offshore drilling and production operations and extend from the wellhead at the ocean floor to a surface vessel. These risers have typically been manufactured in fifty and eighty foot lengths. During normal operation the flanged connection between adjacent riser joints must contain internal pressure along with enormous external loads due to environmental conditions. It is critical that these flanged connections, and the threaded fasteners holding them together, function flawlessly. These flanged connections and the threaded fasteners connecting them are the area to which the present invention most closely applies.

2. Description of Related Art

An apparatus for stretching threaded fasteners is shown in U.S. Pat. No. 3,749,362 (O'Connor et al.) The apparatus shown by O'Connor et al. uses an external fastener stretcher threaded onto a bolt to apply an axial load to the bolt wherein the bolt's nut can then be tightened with minimal torque. Removal of the fastener stretcher allows the bolt and nut to retain the load induced in the bolt.

SUMMARY OF THE INVENTION

The current invention uses a radially tapered surface that is machined into the backface of the flange, adjacent to the bolt or stud holes, to compensate for the axial or meridional direction bending that the flange undergoes during fastener tightening. The machined radially tapered surface ensures that as the flanges bend the threaded fastener remains straight and thereby minimizes the bending stress transmitted to the fastener.

According to the present invention, in a first embodiment a radially tapered surface is machined into the backface of the upper flange adjacent each of the bolt holes. The lower flange has a plurality of complementary holes threaded to receive the bolt. As the bolt fastener is tightened to its predetermined value and the flange deflects, the head of the fastener remains vertical while the radially tapered surface moves downwardly. At maximum fastener torque and flange deflection, the machined radially tapered surface of the backface of the flange is in substantially face to face contact with the head of the fastener and perpendicular to the axis of the fastener.

In a second embodiment of the invention, an all thread stud with a single nut is used in place of the bolt of the first embodiment. A radially tapered surface is machined into the backface of the upper flange adjacent each of the stud holes. The lower flange has a plurality of complementary holes threaded to receive the all thread stud. As in the first embodiment, as the nut of the fastener is tightened to its predetermined value and the flange deflects, the head of the fastener remains vertical while the radially tapered surface moves downwardly. At maximum fastener torque and flange deflection, the machined radially tapered surface of the backface of the flange is in substantially face to face contact with the nut of the fastener and perpendicular to the axis of the fastener.

In a third embodiment of the invention, an all thread stud with a pair of nuts is used in place of the fasteners of the previous embodiments. A radially tapered surface is machined into the backface of the upper and lower flanges adjacent each of the stud holes. As in the previous embodiments, as the nuts of the fastener are tightened to their predetermined value and the flange deflects, the fastener remains vertical while the radially tapered surface moves downwardly. At maximum fastener torque and flange deflection, the machined radially tapered surfaces of the backface of the flanges are in substantially face to face contact with the nuts of the fasteners and perpendicular to the axis of the fastener.

A principal object of the present invention is to provide an apparatus to reduce the bending stress transmitted to threaded fasteners due to deflection of the flange.

Another object of the present invention is to provide an apparatus for increasing the fatigue life of threaded fasteners used in flanged connections.

A final object of the present invention is to provide an apparatus for reducing the bending stress in threaded fasteners without requiring the use of special fasteners.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PRESENTLY PREFERRED EMBODIMENTS

Figure 1:
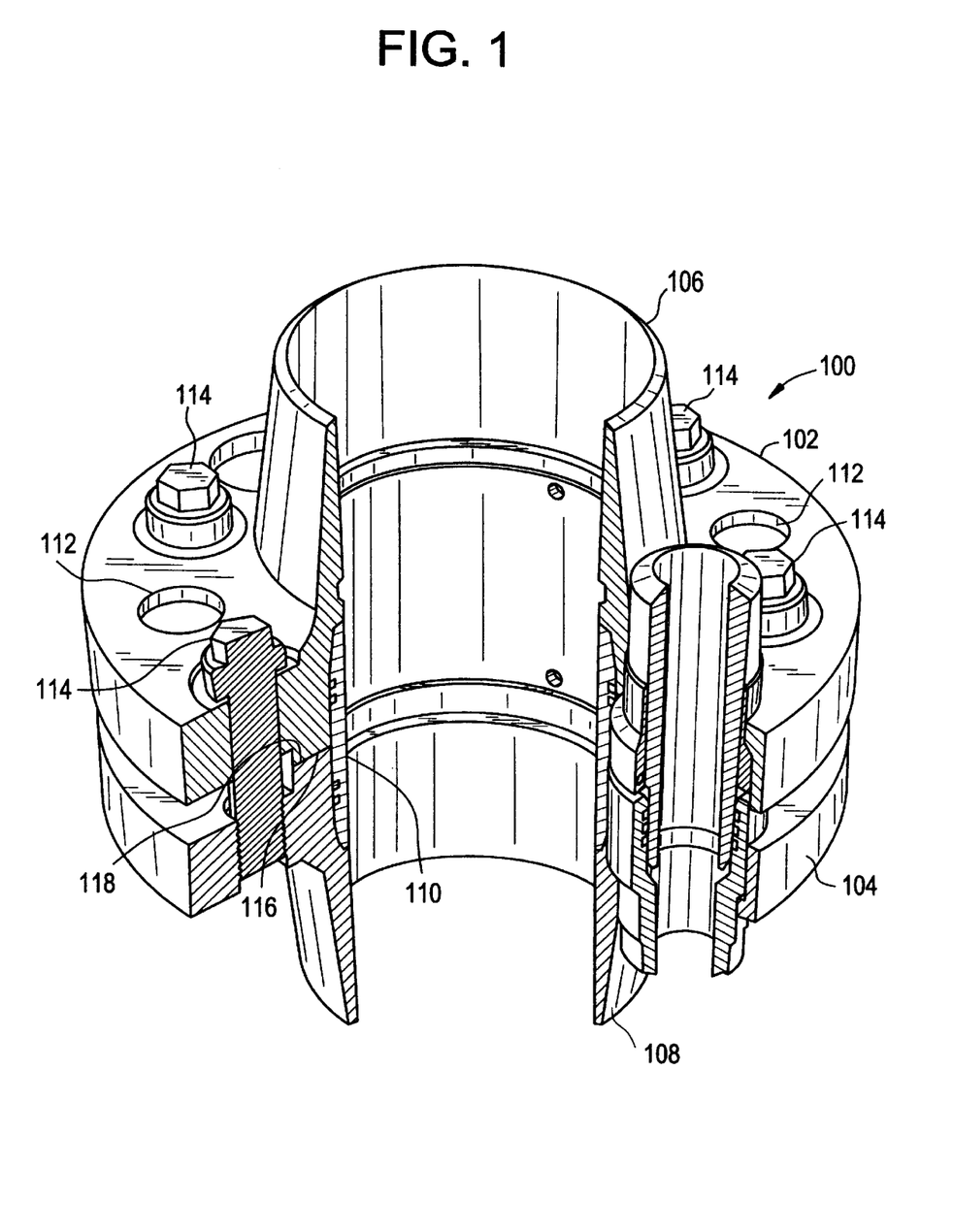
FIG. 1 is an isometric view of a riser connector used in subsea oil and gas drilling operations with the backface of the flanges machined with a radially tapered surface.

With reference to the drawings, and particularly to FIG. 1, riser connector 100 is shown in an isometric view. Riser connector 100 includes first or upper flange 102 and second or lower flange 104. Upper flange 102 and lower flange 104 include butt weld preparations 106 and 108, respectively, for attaching appropriate sized tubular members (not shown) as is well known in the art. Seal element 110 is disposed in the bores of upper flange 102 and lower flange 104. A plurality of fastener holes 112 are spaced circumferentially around upper flange 102 and lower flange 104 with threaded fasteners 114 disposed therein. Upper flange 102 and lower flange 104 include raised faces 116 and 118, respectively, that are held in face to face contact when threaded fasteners 114 are tightened to a specified torque value.

Figure 2:
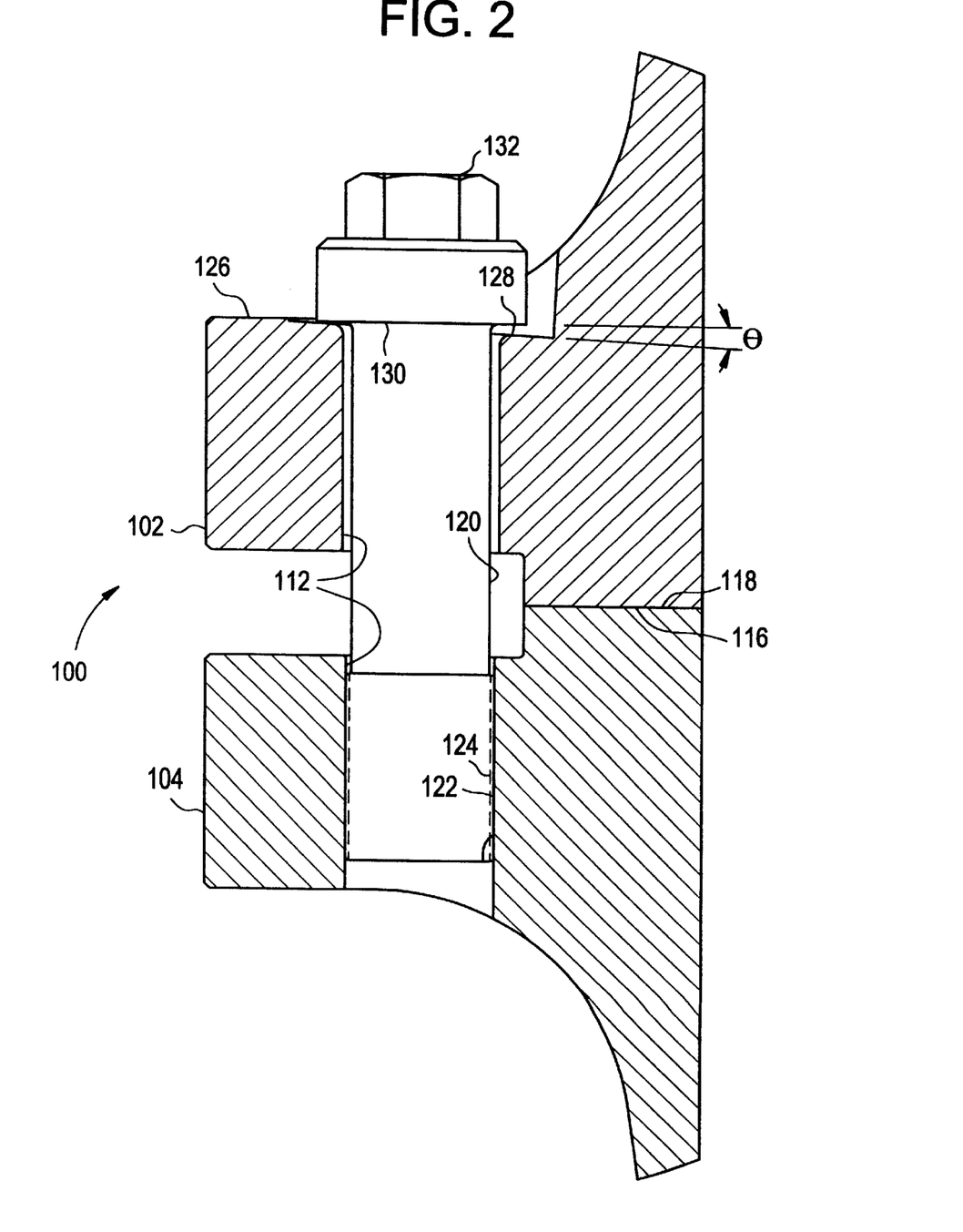
FIG. 2 is a sectional view of the first embodiment of the radially tapered surface bending stress reducing apparatus using a threaded bolt fastener with the riser connectors unloaded.

As best seen in FIG. 2, the first embodiment of the present invention includes upper flange 102 and lower flange 104 with raised faces 116 and 118, respectively. Fastener hole 112 in upper flange 102 receives threaded fastener 120 in close fitting relationship. Fastener hole 112 in lower flange 104 includes threads 122 to engage threads 124 of threaded fastener 120. Upper flange 102 includes backface 126 with radially tapered surface 128 machined thereon.

The radially tapered surface 128 is tapered radially as shown to define angle θ between tapered surface 128 and the underside 130 of the head 132 of threaded fastener 120. When threaded fastener 120 is initially installed and threaded into lower flange 104, the underside 130 of the head 132 of threaded fastener 120 contacts tapered surface 128 at the outer edge and angle θ as shown.

Figure 3:
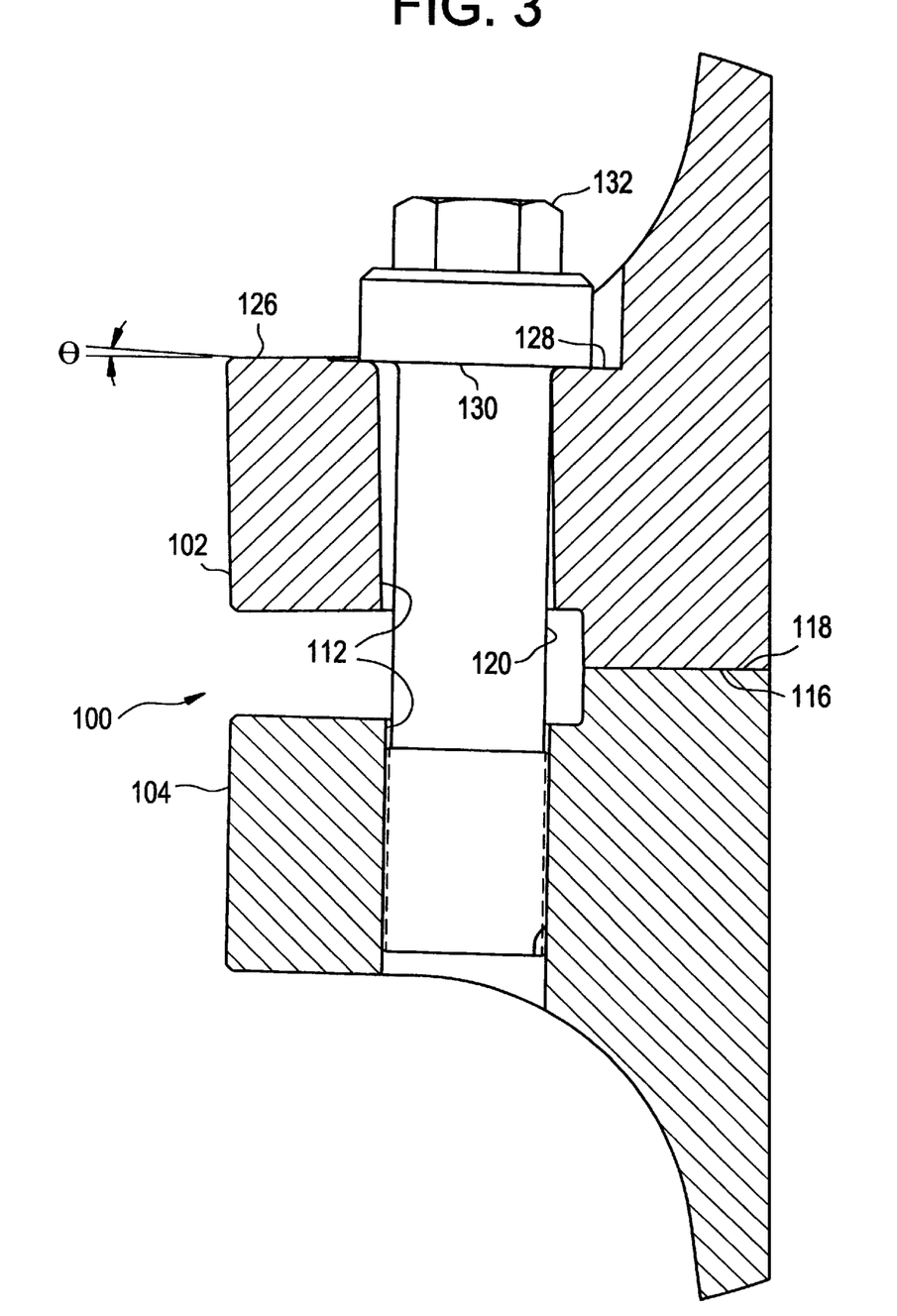
FIG. 3 is a sectional view of the first embodiment of the radially tapered surface bending stress reducing apparatus using a threaded bolt fastener with the riser connectors loaded.

Referring to FIG. 3, when threaded fastener 120 is fully tightened, the flange 102 has deflected downwardly by the angle θ. Radially tapered surface 128 is in face to face contact with underside 130 of the head 132 of threaded fastener 120 and perpendicular to the axis of the fastener 120. This radially tapered surface 128 minimizes the bending stress from meridional bending of upper flange 102 transmitted to threaded fastener 120. This reduction in bending stress on threaded fastener 120 is a significant factor in increasing the fatigue life of threaded fasteners 120.

Figure 4:
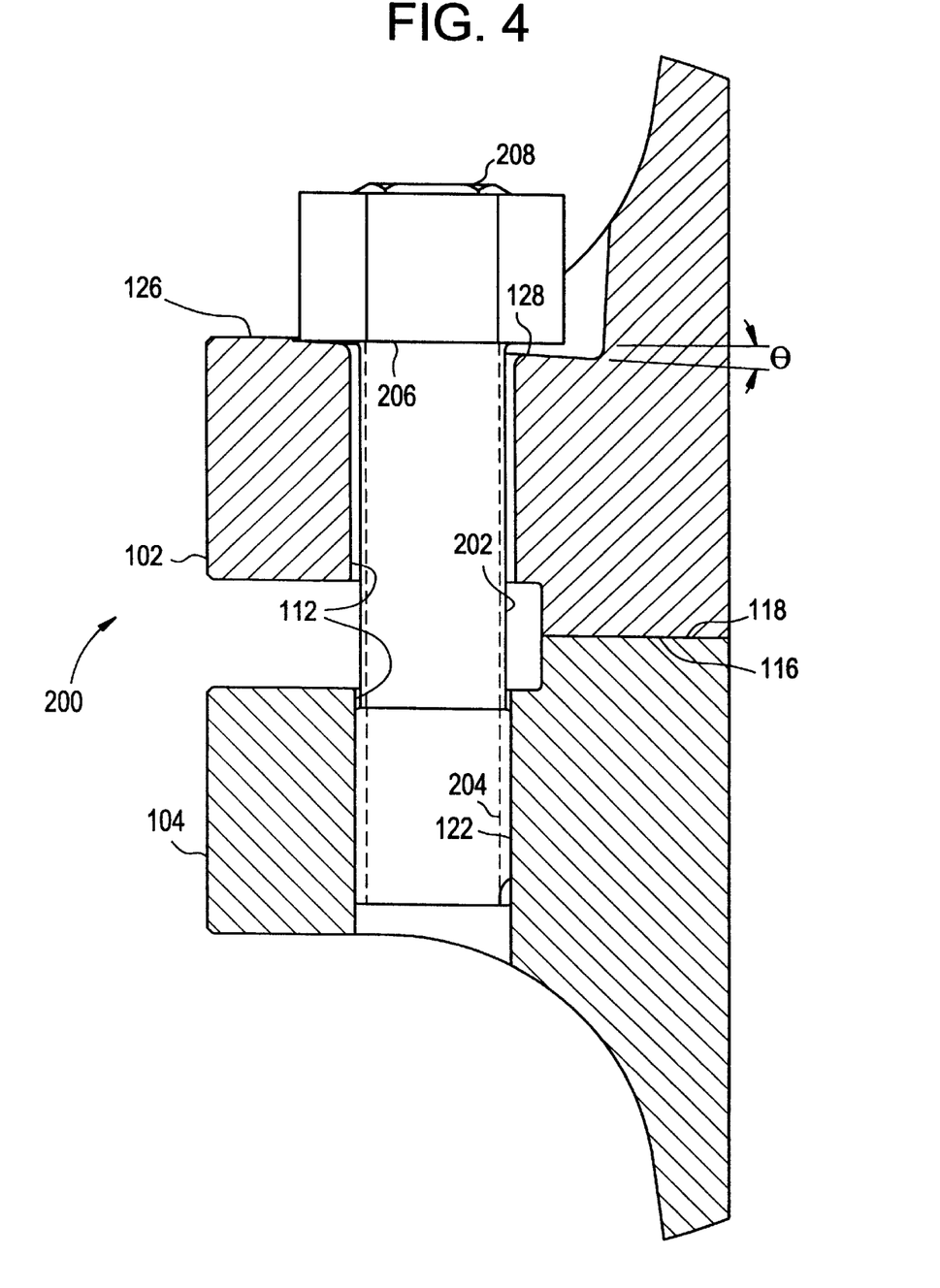
FIG. 4 is a sectional view of the second embodiment of the radially tapered surface bending stress reducing apparatus using a threaded stud and single nut with the riser connectors unloaded

A second embodiment of the present invention is shown in FIG. 4. Those items that are the same as in the first embodiment retain the same numeric designation. As in the first embodiment, riser connector 200 includes upper flange 102 and lower flange 104 with raised faces 116 and 118, respectively. Fastener hole 112 in upper flange 102 receives threaded stud 202 in close fitting relationship. Fastener hole 112 in lower flange 104 includes threads 122 to engage threads 204 of threaded stud 202. Upper flange 102 includes backface 126 with radially tapered surface 128 machined thereon.

The radially tapered surface 128 is tapered radially as shown to define angle θ between tapered surface 128 and the underside 206 of nut 208 of threaded stud 202. After threaded stud 202 is initially installed and threaded into lower flange 104, nut 208 is tightened and the underside 206 of nut 208 contacts tapered surface 128 at the outer edge and angle θ as shown.

Figure 5:
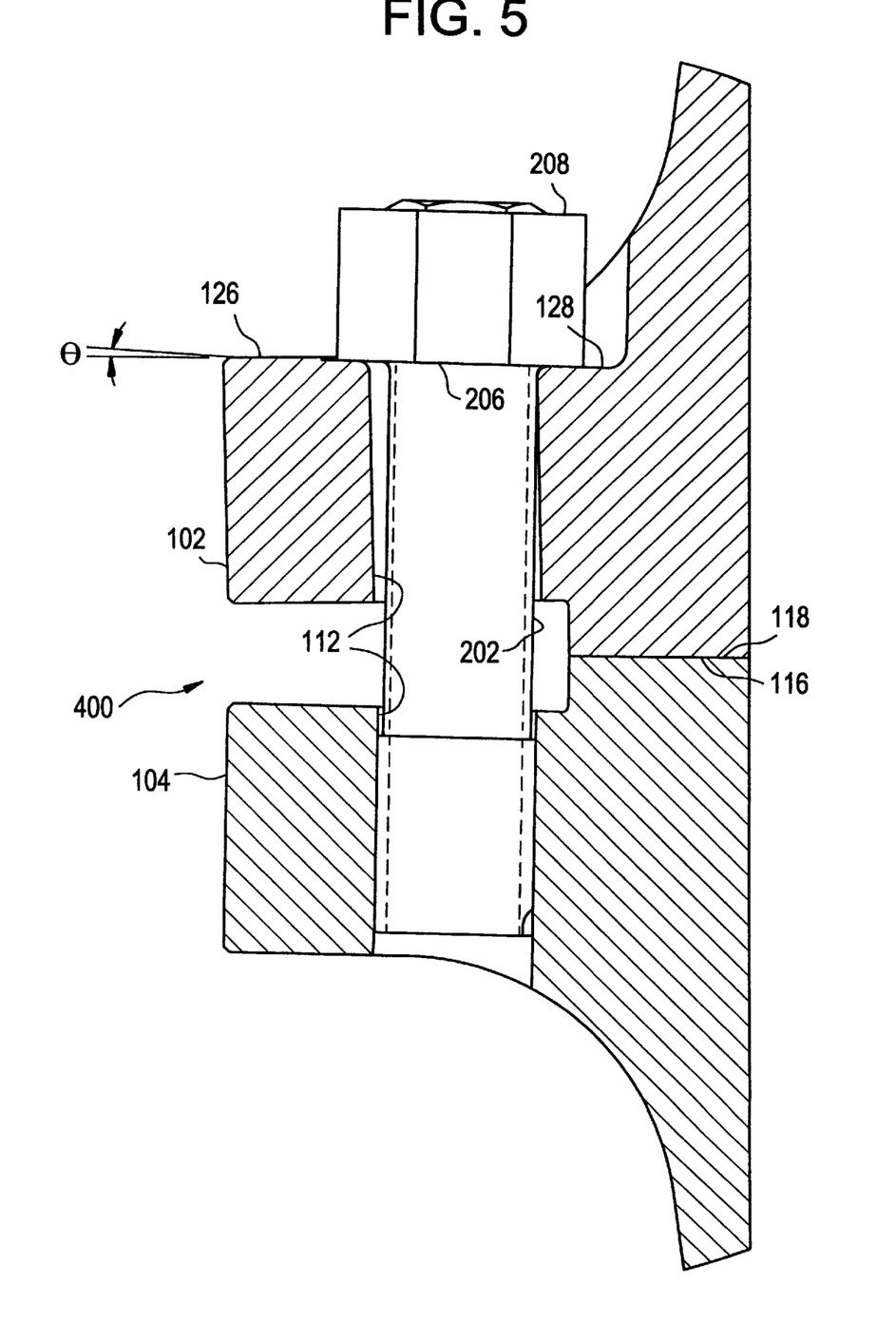
FIG. 5 is a sectional view of the second embodiment of the radially tapered surface bending stress reducing apparatus using a threaded stud and single nut with the riser connectors loaded.

As best seen in FIG. 5, when nut 208 is fully tightened, the flange 102 has deflected downwardly by the angle θ. Tapered surface 128 is in face to face contact with underside 206 of nut 208 of threaded stud 202 and perpendicular to the axis of the stud 202. This tapered surface 128 minimizes the bending stress from meridional bending of upper flange 102 transmitted to threaded stud 202. This reduction in bending stress on threaded stud 202 is a significant factor in increasing the fatigue life of threaded studs 202.

Figure 6:
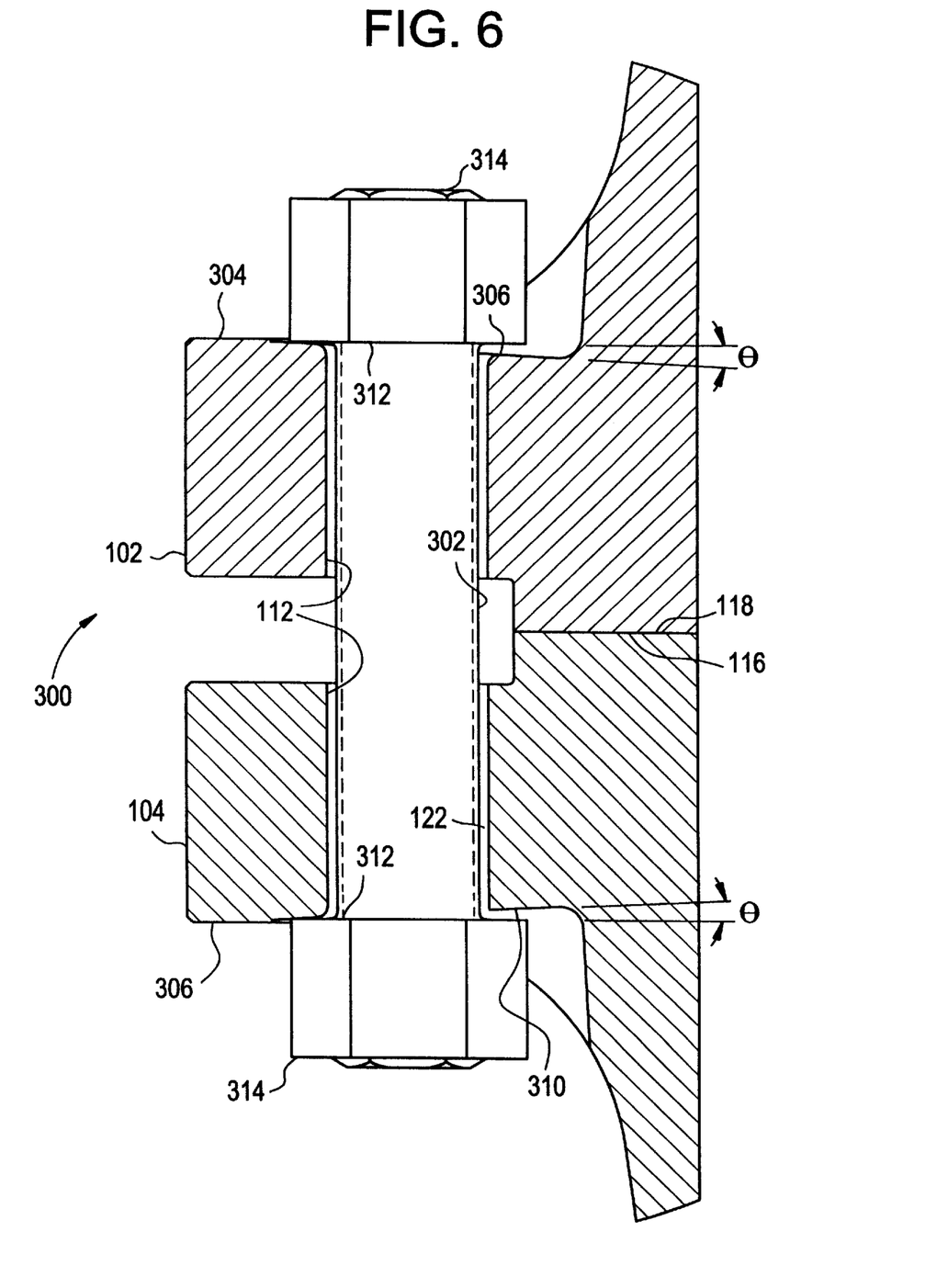
FIG. 6 is a sectional view of the third embodiment of the radially tapered surface bending stress reducing apparatus using a threaded stud and two nuts with the riser connectors unloaded

A third embodiment of the present invention is shown in FIG. 6. Those items that are the same as in the first two embodiments retain the same numeric designation. As in the prior embodiments, riser connector 300 includes upper flange 102 and lower flange 104 with raised faces 116 and 118, respectively. Fastener hole 112 in upper flange 102 and lower flange 104 receives threaded stud 302 in close fitting relationship. Upper flange 102 and lower flange 104 include backfaces 304 and 306, respectively, with radially tapered surfaces 308 and 310 machined thereon, respectively.

Radially tapered surfaces 308 and 310 are tapered radially as shown to define angle θ between radially tapered surfaces 308 and 310 and the underside 312 of nuts 314 of threaded stud 302. After threaded stud 302 is initially installed, nuts 314 are tightened and the undersides 312 of nuts 314 contact tapered surfaces 308 and 310 at the outer edge and angle θ as shown.

Figure 7:
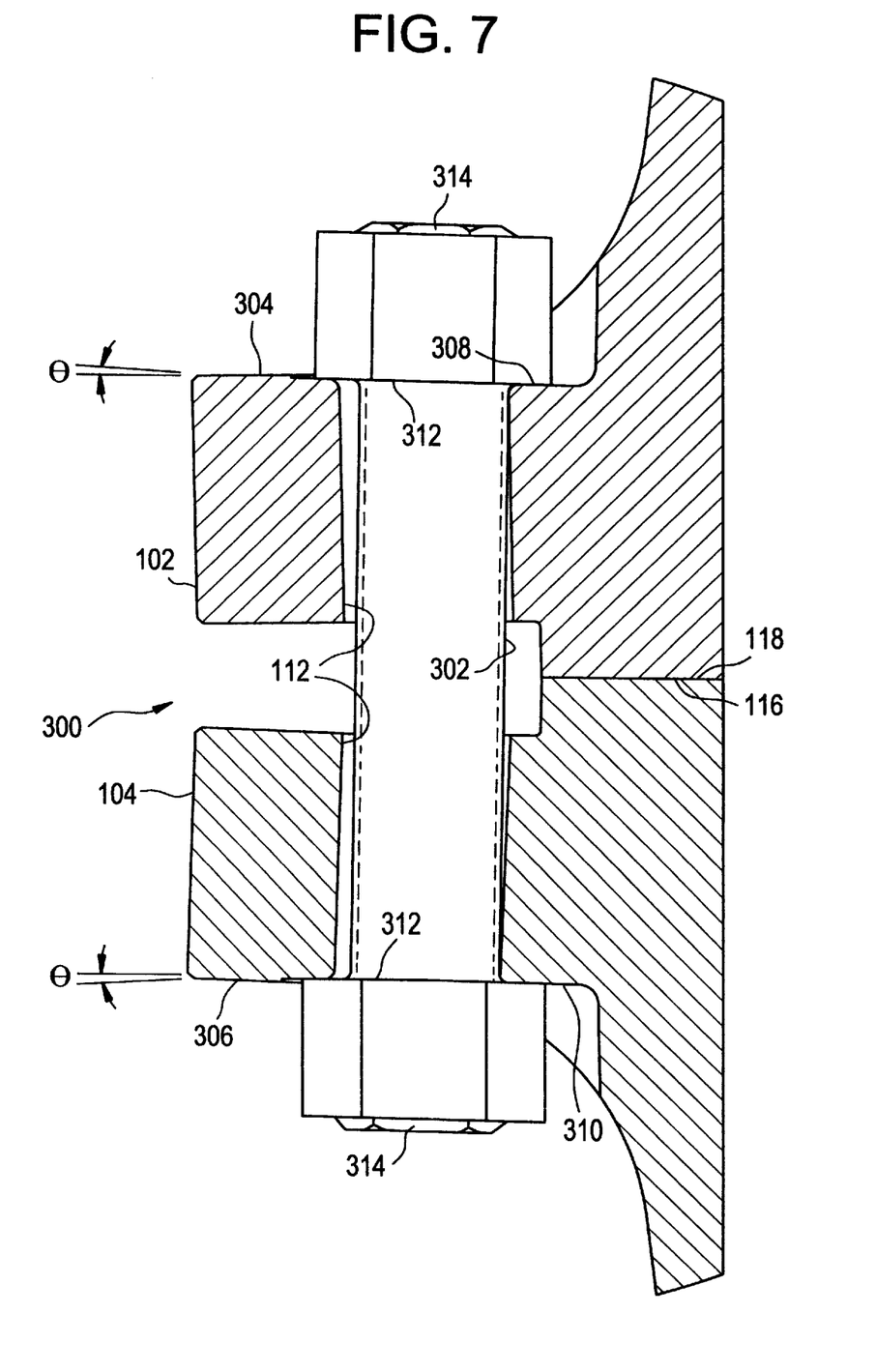
FIG. 7 is a sectional view of the third embodiment of the radially tapered surface bending stress reducing apparatus using a threaded stud and two nuts with the riser connectors loaded.

As best seen in FIG. 7, when nuts 314 are fully tightened, the flanges 102 and 104 are deflected by the angle θ. Radially tapered surfaces 308 and 310 are in face to face contact with underside 312 of nuts 314 of threaded stud 302 and perpendicular to the axis of the stud 302. These radially tapered surfaces 308 and 310 minimize the bending stress from meridional bending of upper flange 102 and lower flange 104 transmitted to threaded stud 302. This reduction in bending stress on threaded stud 302 is a significant factor in increasing the fatigue life of threaded studs 302. Although shown with both flanges having radially tapered surfaces, the present invention envisions and claims a construction with only one flange having the radially tapered surfaces machined therein.

My improved apparatus to reduce the bending stress transmitted to threaded fasteners due to flange deflection and the methods of its application will be readily understood from the foregoing description and it will be seen I have provided an improved apparatus requiring minimal modification to existing flanges to reduce the bending stresses transmitted to the threaded fasteners. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A flanged connection fastener bending stress reduction apparatus, comprising:

first and second flanges in facing relationship, said first flange having a plurality of fastener holes therethrough, said second flange having a plurality of complementary fastener holes therein;

said first flange fastener holes having a radially tapered surface on the back face of said first flange, said radially tapered surface being only adjacent said first flange fastener holes;

a fastener extending through said first flange fastener holes;

said radially tapered surface of said first flange fastener holes configured to minimize bending stress on said fastener when said fastener is tensioned;

said fastener including first and second preload retaining means, said radially tapered surface adjacent said first flange fastener holes engaging said fastener first preload retaining means; and, said fastener first and second preload retaining means engaging said first and second flages, respectively whereby tensioning of said fastener preloads said fastener and maintains said first and second flanges in preloaded abutting relationship.

2. A flanged connection fastener bending stress reduction apparatus according to claim 1 wherein:

said first fastener preload retaining means includes a flanged end, said flanged end having an upper end configured to receive a wrenching means for tightening said fastener, said lower end of said flanged end of said first fastener preload retaining means having a flat face;

said second fastener preload retaining means includes a threaded end; and, said second flange complementary holes are threaded to receive said second fastener preload retaining means threaded end.

3. A flanged connection fastener bending stress reduction apparatus according to claim 2 wherein:

tensioning of said fastener causes said radially tapered surface to engage said flat face of said lower end of said flanged end of said first fastener preload retaining means in face to face contact.

4. A flanged connection fastener bending stress reduction apparatus according to claim 1 wherein:

said first fastener preload retaining means includes a threaded end and a nut positioned thereon, said lower end of said nut having a flat face;

said second fastener preload retaining means includes a threaded end; and, said second flange complementary holes are threaded to receive said second fastener preload retaining means threaded end.

5. A flanged connection fastener bending stress reduction apparatus according to claim 4 wherein:

tensioning of said fastener causes said radially tapered surface to engage said flat face of said nut of said first fastener preload retaining means in face to face contact.

6. A flanged connection fastener bending stress reduction apparatus according to claim 1 wherein:

said first fastener preload retaining means includes a threaded end and a nut positioned thereon, said lower end of said nut having a flat face; and, said second fastener preload retaining means includes a threaded end and a nut positioned thereon.

7. A flanged connection fastener bending stress reduction apparatus according to claim 6 wherein:

tensioning of said fastener causes said radially tapered surface to engage said flat face of said nut of said first fastener preload retaining means in face to face contact.

8. A flanged connection fastener bending stress reduction apparatus according to claim 1 wherein:

said second flange fastener holes having a radially tapered surface on the back face of said second flange;

said first fastener preload retaining means includes a threaded end and a nut positioned thereon, said nut having a flat face; and, said second fastener preload retaining means includes a threaded end and a nut positioned thereon, said nut having a flat face.

9. A flanged connection fastener bending stress reduction apparatus according to claim 8 wherein:

tensioning of said fastener causes said radially tapered surfaces to engage said flat faces of said nuts of said first and second fastener preload retaining means in face to face contact.

* * * * *